(12) United States Patent
Rhode et al.

(10) Patent No.: US 9,037,312 B2
(45) Date of Patent: May 19, 2015

(54) TRAILER HEADING ANGLE USING VEHICLE WHEEL SPEED SENSORS

(71) Applicant: Ford Global Technologies, Dearborn, MI (US)

(72) Inventors: Douglas Scott Rhode, Farmington Hills, MI (US); Darrel Alan Recker, Ypsilanti, MI (US); Erick Michael Lavoie, Dearborn, MI (US)

(73) Assignee: Ford Global Technologies, Dearborn, MI (US)

( * ) Notice: Subject to any disclaimer, the term of this patent is extended or adjusted under 35 U.S.C. 154(b) by 127 days.

(21) Appl. No.: 14/010,117

(22) Filed: Aug. 26, 2013

(65) Prior Publication Data

US 2015/0057903 A1 Feb. 26, 2015

(51) Int. Cl.
*B62D 63/08* (2006.01)
*B60T 7/20* (2006.01)
*G01B 21/22* (2006.01)

(52) U.S. Cl.
CPC . *B60T 7/20* (2013.01); *G01B 21/22* (2013.01); *B62D 63/08* (2013.01)

(58) Field of Classification Search
USPC .......................................................... 340/341
See application file for complete search history.

(56) References Cited

U.S. PATENT DOCUMENTS

| 4,212,483 | A | * | 7/1980 | Howard | 280/444 |
|---|---|---|---|---|---|
| 5,570,754 | A | * | 11/1996 | Stimson | 180/234 |
| 5,747,683 | A | * | 5/1998 | Gerum et al. | 73/117.01 |
| 6,292,094 | B1 | * | 9/2001 | Deng et al. | 340/431 |
| 6,668,225 | B2 | | 12/2003 | Oh | |
| 6,854,557 | B1 | * | 2/2005 | Deng et al. | 180/445 |
| 6,959,970 | B2 | | 11/2005 | Tseng | |
| 7,272,481 | B2 | | 9/2007 | Einig | |
| 7,690,737 | B2 | | 4/2010 | Lu | |
| 8,010,252 | B2 | * | 8/2011 | Getman et al. | 701/37 |
| 2003/0234512 | A1 | | 12/2003 | Holub et al. | |
| 2004/0222881 | A1 | * | 11/2004 | Deng et al. | 340/431 |
| 2005/0001477 | A1 | * | 1/2005 | Mederer et al. | 303/113.5 |
| 2005/0039972 | A1 | * | 2/2005 | Deng et al. | 180/408 |

(Continued)

FOREIGN PATENT DOCUMENTS

| DE | 3931518 A1 | 4/1991 |
|---|---|---|
| DE | 9208595 U1 | 8/1992 |

(Continued)

OTHER PUBLICATIONS

Adaptive Software and Systems Architecture for Driver Assistance Systems.

(Continued)

*Primary Examiner* — Shelley Chen
(74) *Attorney, Agent, or Firm* — Angela M. Brunetti; Raymond Coppiellie

(57) ABSTRACT

A system and method of calculating a heading angle for a trailer that is being backed by a vehicle. A trailer backup assist control module, in communication with a hitch angle detecting apparatus, receives a hitch angle and determines displacement of left and right vehicle wheels using information supplied by vehicle wheel speed sensors while the vehicle is backing the trailer. A vehicle heading angle is determined using left and right wheel displacement information and a known vehicle track width. A trailer heading angle is then calculated using the vehicle heading angle and the hitch angle.

12 Claims, 2 Drawing Sheets

(56) References Cited

U.S. PATENT DOCUMENTS

| | | | |
|---|---|---|---|
| 2006/0206253 A1* | 9/2006 | Yu | 701/70 |
| 2007/0152424 A1* | 7/2007 | Deng et al. | 280/432 |
| 2008/0180526 A1 | 7/2008 | Trevino et al. | |
| 2010/0324770 A1 | 12/2010 | Ramsey et al. | |
| 2011/0018231 A1* | 1/2011 | Collenberg | 280/448 |
| 2011/0029210 A1 | 2/2011 | Wu | |
| 2011/0050903 A1 | 3/2011 | Vorobiev et al. | |
| 2011/0216199 A1 | 9/2011 | Trevino et al. | |
| 2012/0200706 A1 | 8/2012 | Greenwood et al. | |
| 2012/0271512 A1* | 10/2012 | Rupp et al. | 701/41 |
| 2012/0271514 A1 | 10/2012 | Lavole et al. | |
| 2012/0271515 A1* | 10/2012 | Rhode et al. | 701/42 |
| 2013/0018552 A1* | 1/2013 | Foster et al. | 701/50 |
| 2013/0179038 A1* | 7/2013 | Goswami et al. | 701/42 |
| 2014/0005918 A1 | 1/2014 | Qiang | |
| 2014/0277941 A1* | 9/2014 | Chiu et al. | 701/41 |

FOREIGN PATENT DOCUMENTS

| | | |
|---|---|---|
| DE | 10154612 A1 | 5/2003 |
| DE | 102006002294 | 7/2007 |
| DE | 102005056408 | 6/2008 |
| EP | 0418653 A1 | 3/1991 |
| WO | WO 2006042665 | 4/2006 |
| WO | WO 2012103193 | 8/2012 |

OTHER PUBLICATIONS

Verma et al. The Directional Behavior During Braking of a Tractor/Semi-Trailer Fitted With Anti-Locking Devices, Sep. 28, 1984 http://trid.trb.org/view.aspx?id=160344.

Electronic Braking System New Generation http://www.wabco-auto.com/uploads/media/Product_Brochure-EBS_04.pdf.

Wheel Direction Sensor System http://www.wheelmonitor.com/downloads/RM-50_Manual_Diagram_32006.pdf.

Meritor Wabco Reverse Detection Module for Trailers http://www.meritorhvs.com/MeritorHVS_Documents/tp02172.pdf.

* cited by examiner

TRAILER HEADING ANGLE USING VEHICLE WHEEL SPEED SENSORS

TECHNICAL FIELD

The disclosures made herein relate generally to estimating a trailer heading angle using vehicle wheel speed sensors and, more particularly, to estimating a trailer heading angle for a trailer backup assist system.

BACKGROUND

Backing up a vehicle with a trailer attached is a difficult task for many drivers. This is particularly true for drivers that are untrained at backing up with a trailer attached, or drive with an attached trailer on an infrequent basis. To assist the driver in steering a vehicle with a trailer a Trailer Backup Assist (TBA) system is provided to assist the driver in maneuvering a vehicle with a trailer attached along a prescribed path. The driver may specify the trailer path curvature as the maneuver is executed.

Such TBA systems have TBA controller that uses trailer heading angle as an input in the control algorithm. Since a single vehicle may be attached to several trailers, it is desirable to use sensors on the towing vehicle to provide the trailer heading angle in order to avoid the cost and complexity associated with including the sensing capacity to each and ever trailer. Current TBA systems utilize a GPS system that compares to position estimates, an electronic compass, or inertial sensors, such as yaw rate sensors. However, each of these systems is expensive and complex.

There is a need to estimate trailer heading angle using sensors that are readily available on a towing vehicle.

SUMMARY

A method of calculating a heading angle for a trailer that is being hacked by a vehicle. A trailer backup assist control module, in communication with a hitch angle detecting apparatus, receives a hitch angle and determines displacement of left and right vehicle wheels using information supplied by vehicle wheel speed sensors while the vehicle is backing the trailer. A vehicle heading angle is determined using left and right wheel displacement information and a known vehicle track width. A trailer heading angle is then calculated using the vehicle heading angle and the hitch angle.

A brake system, coupled to the trailer backup assist control module, may provide vehicle wheel speed information. Wheel speed information may be provided by wheel speed sensors a each wheel location on the vehicle. The trailer heading angle may be calculated by summing the vehicle heading angle and the hitch angle.

Elements and steps in the figures are illustrated for simplicity and clarity and have not necessarily been rendered according to any particular sequence. For example, steps that may be performed concurrently or in different order are illustrated in the figures to help to improve understanding of embodiments of the inventive subject matter.

DESCRIPTION OF INVENTION

While various aspects of the inventive subject matter are described with reference to a particular illustrative embodiment, the invention is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Figure 1:
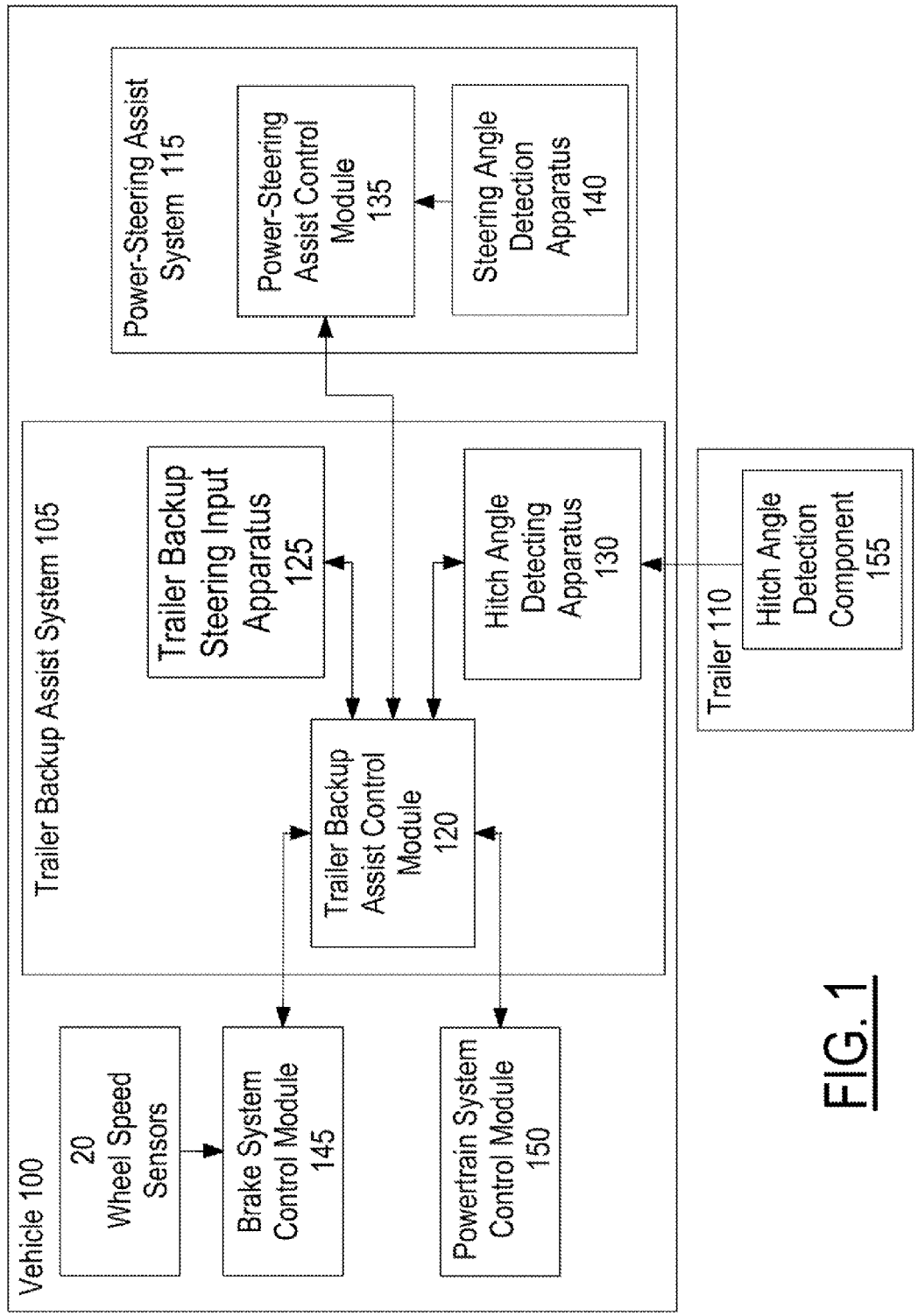
FIG. 1 is a block, diagram of a vehicle having a trailer backup assist system and a trailer.

FIG. 1 is a block diagram of a vehicle 100 having a trailer backup assist system 105 and a trailer 110. The trailer backup assist system 105 controls the backup travel of the vehicle 100 while the trailer 110 is attached. Such control is accomplished through interaction of a power assisted steering system 115 of the vehicle 100 and the trailer backup assist system 105. During operation of the trailer backup assist system 105 while the vehicle is being reversed the trailer backup assist system 105 is in control of the power assisted steering system 115 and the power assisted steering system 115 is coupled to the vehicle steering wheel.

The trailer backup assist system 105 typically includes a trailer backup assist control module 120, a trailer backup steering input apparatus 125, and a hitch angle detecting apparatus 130. The trailer backup assist control module 120 is connected to the trailer backup steering input apparatus 125 and the hitch angle detecting apparatus 130 for communicating information. The trailer backup assist control module 120 is attached to a power-steering assist control module 135 of the power-steering assist system 115 for allowing information to be communicated. A steering angle detection apparatus 140 of the power-steering assist system 115 is connected to the power-steering assist control module 135 for providing information thereto. The trailer backup assist system 105 is also attached to a brake system control module 145 and a powertrain control module 150 for allowing communication of information. Wheel speed sensors 20, which may be present at each vehicle wheel, are coupled to the brake system control module 145 and provide wheel speed information thereto.

The trailer backup assist control module 120 is configured for implementing logic instructions for receiving information from the trailer backup steering input apparatus 125, the hitch angle detecting apparatus 130, the power-steering assist control module 135, the brake system control module 145, and the powertrain control module 150. The trailer backup assist control module 120 generates vehicle steering information as a function of all, or a portion of the information received from the trailer backup steering input apparatus 125, the hitch angle detecting apparatus 130, the power-steering assist control module 135, the brake system control module 145, and the powertrain control module 150. The vehicle steering, information is provided to the power-steering assist control module 135 for steering of the vehicle 100 by the power-steering assist system 115 to achieve a commanded path of travel for the trailer 110.

The hitch angle detecting apparatus 130, which operates in conjunction with a hitch angle detection component 155 of the trailer 110, provides the trailer backup assist control module 120 with information relating to an angle between the vehicle 100 and the trailer 110.

The power-steering assist control module 135 provides the trailer backup assist control module 120 with information relating to a rotational position of the steering wheel angle and/or a rotational position of steered wheels of the vehicle 100.

The brake system control module 145 provides the trailer backup assist control module 120 with information relating to vehicle speed. Such vehicle speed information cm be determined from individual wheel speeds as monitored by the brake system control module 145, The trailer backup assist control module 120 may also provide vehicle braking information to the brake system control module 145 for allowing the trailer backup assist control module 120 to control braking of the vehicle 100 during backup of the trailer 110. For example using the trailer backup assist control module 120 to regulate speed of the vehicle 100 during, backing of the trailer 110 may reduce the potential for unacceptable trailer backup conditions such as vehicle over-speed and jack-knife.

The powertrain control module 150 interacts with the trailer backup assist control module 120 to regulate speed and acceleration of the vehicle 100 during backing of the trailer 110 As mentioned above, this is necessary to limit the potential for unacceptable trailer backup conditions.

The brake system control module 145 may be associated with an anti-lock braking system (ABS) which typically has wheel speed sensors 20 on at least three wheels. The vehicle 100 may have a wheel speed sensor 20 at each wheel of the vehicle 100 and the wheel speed sensors 20 may be mounted adjacent each wheel of the vehicle 100. The brake system control module 145 is in operative communication with each of the wheel speed sensors 20.

Figure 2:
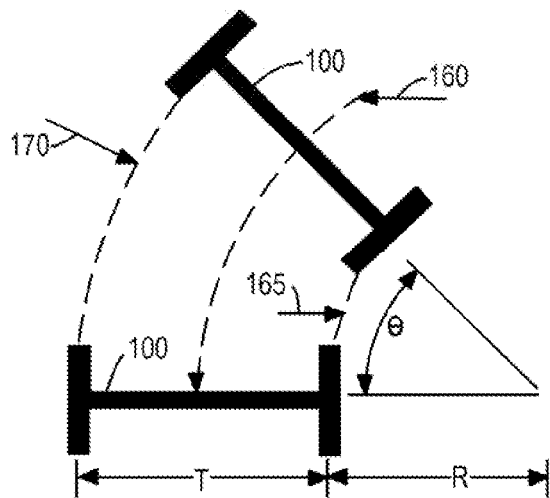
FIG. 2 is a diagram of a vehicle path.

Referring now to FIG. 2, a rear axle of vehicle 100 is shown having a predetermined track width, T, and travelling in reverse along a path 160. Also indicated are a first path 165 which is shown to he the path of the right vehicle wheels and a second path 170 which is shown to be the path of the left vehicle wheels. The wheel speed sensors (not shown in FIG. 2) generate signals corresponding to the rotational speed at each associated wheel. Typically, given the rotational speed and rolling radius of the wheel, the longitudinal velocity at each wheel may be determined. A wheel speed sensor will have a predetermined number of events per revolution. The brake system control module 145 may count the number of events that occur during a fixed time period, which works well when there are a lot of events, as in a higher wheel speed. The brake system control module 145 may also count the time between events. This works well for lower wheel speeds.

During low speed maneuvers, such as when a vehicle is backing a trailer, wheel slip is small and the wheel speed sensors may be used to provide an estimate of vehicle displacement, $d_{right}$ and $d_{left}$ for each of the right and left paths 165, 170. The brake system control module 145 will transmit, or broadcast, a number of events at a predetermined time interval. The number of events is supplied to the trailer backup assist control module and using this information, it is possible for the trailer backup assist control module to calculate wheel angular displacement.

The trailer backup assist control module converts wheel angular displacement to distance using a nominal rolling radius of the vehicle wheels. The nominal rolling radius, also known as free rolling radius. In the distance travelled divided by two times the angular rotation of the tire measured in radians. in some instances, the nominal rolling radius may be a predetermined value that is stored in memory and may depend upon the wheel option, tire wear, tire pressure, tire slip, and tire loading, all of which may be taken into account when calculating, the displacement in order to improve the accuracy of the estimate.

The displacement information is used to estimate a relative heading angle, θ, of the vehicle. The vehicle heading angle is then used, along with a hitch angle, δ, from trailer hitch angle detection component 155 and hitch angle detecting apparatus 130, to calculate a trailer heading angle $θ_{Trailer}$, that may be provided as an input to the trailer backup assist control module 120.

The vehicle heading angle, θ, may be determined by the vehicle displacement, d, for each of the right and left paths 165, 170 where R is the radius of curvature of the vehicle and T is the track, or track width, of the vehicle.

$$\theta_{left} = \frac{d_{left}}{R+T} \tag{1}$$

$$\theta_{right} = \frac{d_{right}}{R} \tag{2}$$

Setting both angles equal $\theta_{left}=\theta_{right}$, $$\frac{d_{left}}{R+T} = \frac{d_{right}}{R} \tag{3}$$

When reduced, the equation gives:

$$\theta = \frac{d_{left} - d_{right}}{T} \tag{4}$$

Once the heading angle, θ, 160 of the vehicle is determined, the hitch angle δ is added, and the trailer heading angle is:

$$\theta_{Trailer} = \theta + \delta \tag{5}$$

Figure 3:
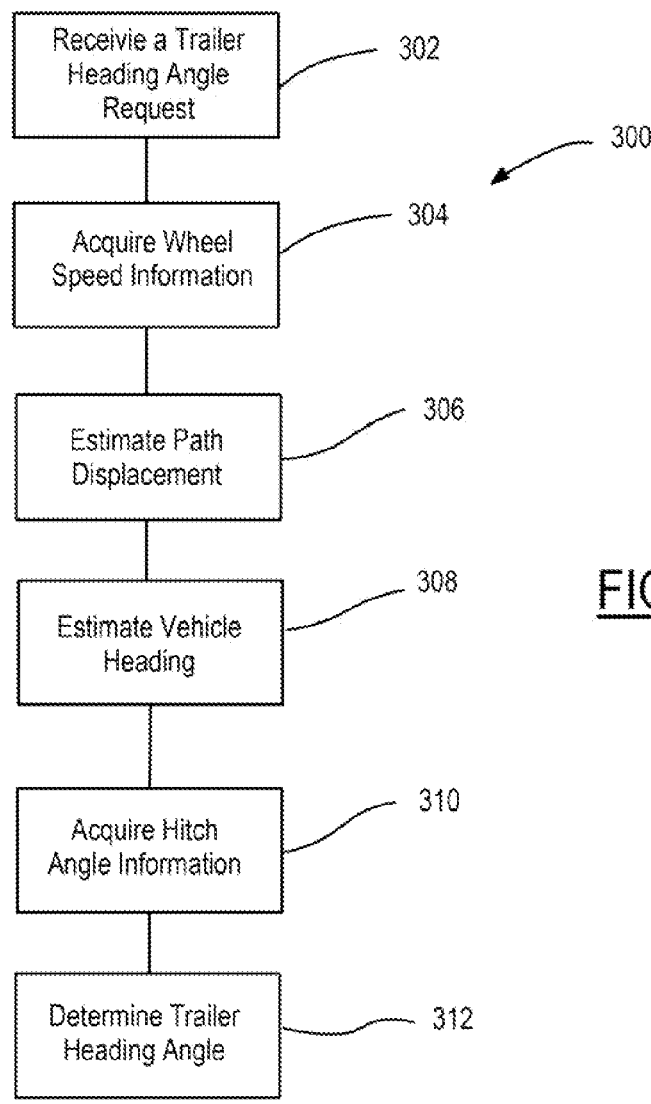
FIG. 3 is a method for implementing determination of trailer heading angle using wheel speed sensors on a vehicle as utilized by a trailer backup assist system.

FIG. 3 is a method for determining trailer heading angle using wheel speed sensors on a vehicle as utilized by a trailer backup assist system. The method 300 for determining trailer heading angle may he carried out using the trailer backup assist system architecture discussed above in reference to the vehicle 100 and trailer 110 of FIG. 1.

An operation 302 is performed for receiving a trailer heading request. Examples of receiving a trailer heading angle request include activating the trailer backup assist system and causing a change to and/or maintaining a trailer path. After receiving a request for trailer heading angle 302, an operation 304 is performed to acquire wheel speed information from the wheel speed sensors of the vehicle. Wheel speed information is supplied by the brake system control module of the vehicle, typically at predetermined time intervals.

Information from the wheel speed sensors is used in an operation 306 to estimate displacement for a left path displacement, $d_{left}$, of the vehicle wheels and for a right path displacement, $d_{right}$, of the vehicle wheels. An operation 308 is performed to calculate a vehicle heading angle, θ, using the left and right path displacement values and a track width value, T, which is a known, fixed value associated with the vehicle. The vehicle track, or track width, is the distance between the centerline of each of two wheels on the same axle.

An operation 310 is performed to acquire a current hitch angle, δ. The hitch angle is an angle between the vehicle and the trailer at the hitch point. The hitch angle detecting apparatus will receive information from the hitch angle detection component as an indication of the current hitch angle. An operation 312 is performed to calculate a current trailer heading angle, $\theta_{Trailer}$, by adding the vehicle heading angle $\theta$ and the hitch angle, $\delta$.

The example provided herein is a simple example using only the rear wheel axle of the vehicle. It is possible, as would be known to one skilled in the art, to expand the approach to include all four wheels, steering angle compensation, a tire rolling radius estimation, and advanced estimation techniques, such as Kalman filter, to improve the accuracy and reliability of the trailer heading angle estimate.

In practice, when the trailer backup assist system 105 is in use and providing the vehicle steering information to the power-steering assist system 115, it is possible, according to the inventive subject matter, to supply the current trailer heading angle to the trailer backup assist system so that any operation for determining vehicle steering information necessary to provide a requested change in the curvature of the trailer's path of travel may be determined in the trailer backup assist control module 120.

The inventive subject if disclosed herein applies some assumptions. For example, it is assumed that the trailer is being backed by the vehicle at a relatively low speed. the wheels of the vehicle have negligible slip, the tires of the vehicle have negligible deformation and the vehicle is exhibiting negligible roll or pitch motions.

In the foregoing specification, the invention has been described with reference to specific exemplary embodiments. Various modifications and changes may be made, however, without departing from the scope of the inventive subject matter as set forth in the claims. The specification and figures are illustrative, rather than restrictive, and modifications are intended to be included within the scope of the inventive subject matter. Accordingly, the scope of the invention should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or an element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but May also include other elements not expressly listed or inherent to such process, method, article, composition or apparatus, Other combinations and or modifications of the above-described structures, arrangements, applications, proportions, elements, materials or components used in the practice of the inventive subject matter, in addition to those not specifically recited, may be varied or otherwise particularly adapted to specific environments, manufacturing specifications design parameters or other operating requirements without departing from the general principles of the same.

The invention claimed is:

1. A method of calculating a trader heading angle for a trailer being backed by a vehicle having a trailer backup assist control module and a hitch angle detecting apparatus, comprising:
   receiving a hitch angle;
   determining displacement of left and right vehicle Wheels using information supplied by vehicle wheel speed sensor information while the vehicle is backing the trailer;
   calculating a vehicle heading angle using the left and right wheel displacements and a vehicle track width; and
   calculating a trailer heading angle using the vehicle heading angle and the hitch angle.

2. The method of claim 1 wherein the step of determining displacement of left and right vehicle wheels further comprises using information supplied by wheel speed sensors at each wheel location on the vehicle.

3. The method of claim 1 wherein the step of determining displacement of left and right vehicle wheels further comprises using vehicle wheel speed sensor information from left and right wheels on a rear axle of the vehicle.

4. The method of claim 1 wherein the step of calculating a trailer heading angle further comprises summing the vehicle heading angle and the hitch angle.

5. A method of supplying a trailer heading angle using a controller on a vehicle having a trailer coupled thereto, the method comprising the steps of:
   receiving a request for a trailer heading angle from a vehicle system;
   receiving hitch angle information from a hitch angle detecting apparatus;
   determining displacement of left and right vehicle wheels using information supplied by at least two wheel speed sensors;
   generating a vehicle heading angle from the displacements and a vehicle track width; and
   summing the vehicle heading angle and the hitch angle information to define a trailer heading angle;
   supplying the trailer heading angle to the vehicle system.

6. The method. as claimed in claim 5 wherein the step of determining displacement further comprises using information supplied by at least two wheel speed sensors on a rear axle.

7. The method as claimed in claim 5 wherein the step of determining displacement further comprises using information supplied by at least two wheel speed sensors while the vehicle is hacking the trailer.

8. A trailer heading angle determination system for a vehicle, comprising:
   a brake system control module for supplying vehicle wheel speed information;
   a hitch angle detecting apparatus for supplying hitch angle information; and
   a trailer backup assist control module coupled to the brake system control module and the hitch angle detecting apparatus, the control module receiving vehicle wheel speed information and hitch angle information from the brake system control module and the hitch angle detecting apparatus, the trailer backup assist control module calculating a trailer heading angle using the vehicle wheel speed information received while the vehicle is backing the trailer, a predetermined vehicle track width and the hitch angle information.

9. The system as claimed in claim 8 wherein the trailer backup assist control module calculates a vehicle heading angle using vehicle wheel speed information and the predetermined vehicle track width and the trailer backup assist control module calculates the trailer heading angle using the vehicle heading angle and the hitch angle.

10. The system as claimed in claim 9 wherein the trailer backup assist control module calculates the trailer heading angle by summing the vehicle heading angle and the hitch angle.

11. The system as claimed in claim 8 wherein the brake system control module supplies vehicle wheel speed information from left and right vehicle wheels.

12. The system as claimed in claim 11 wherein the left and right vehicle wheels are on a rear axle.

* * * * *